US011303707B1

(12) United States Patent
Adler et al.

(10) Patent No.: US 11,303,707 B1
(45) Date of Patent: Apr. 12, 2022

(54) INTERNET OF THINGS SANITIZATION SYSTEM AND METHOD OF OPERATION THROUGH A BLOCKCHAIN NETWORK

(71) Applicants: Joelle Adler, Marina Del Rey, CA (US); Jose Rosas, Santiago (CL)

(72) Inventors: Joelle Adler, Marina Del Rey, CA (US); Jose Rosas, Santiago (CL)

(*) Notice: Subject to any disclaimer, the term of this patent is extended or adjusted under 35 U.S.C. 154(b) by 0 days.

(21) Appl. No.: 16/541,129

(22) Filed: Aug. 14, 2019

Related U.S. Application Data

(60) Provisional application No. 62/718,916, filed on Aug. 14, 2018.

(51) Int. Cl.
*H04L 29/08* (2006.01)
*H04L 29/06* (2006.01)
(Continued)

(52) U.S. Cl.
CPC .............. *H04L 67/125* (2013.01); *A47L 9/00* (2013.01); *A47L 11/02* (2013.01); *A47L 11/29* (2013.01);
(Continued)

(58) Field of Classification Search
CPC ... H04L 67/12; H04L 67/1097; H04L 1/0002; H04L 1/0041; H04L 1/18; H04L 5/0064; H04L 1/0009; H04L 1/1874; H04L 67/306; H04L 67/10; H04L 67/125; H04L 61/609; H04L 63/08; H04L 63/107; H04L 67/02; H04L 67/104; H04L 2209/38; H04L 43/04; H04L 61/1511; H04L 63/0823; H04L 67/1042; H04L 67/141; H04L 9/3239; H04L 12/2856; H04L 12/4633; H04L 12/66; H04L 2209/805; H04L 29/06095; H04L 29/06231; H04L 29/12; H04L 41/0233; H04L 41/08; H04L 41/0803;
(Continued)

(56) References Cited

U.S. PATENT DOCUMENTS

2017/0064073 A1* 3/2017 Spencer ................ H04W 4/023
2017/0346091 A1* 11/2017 Kano ....................... C30B 29/32
(Continued)

*Primary Examiner* — Djenane M Bayard
(74) *Attorney, Agent, or Firm* — Mark C. Johnson; Johnson Dalal

(57) ABSTRACT

An Internet of Things sanitization system and method of operation through a blockchain network provides one or more independently operating sanitizing assemblies comprise a reservoir containing sanitizing medium and a sanitizing mechanism work to sanitize/clean a surface. The sanitizing assemblies connect through a blockchain network, so as to generate, collect, process, and communicate data pertinent to the cleaning. The data is transmitted across a peer-to-peer network, such as a blockchain network for the purposes of: identifying a user; determining which of the sanitizing assemblies and components thereof are operable, and determining usage metrics of the sanitization assemblies. Data is collected directly from the sanitizing assemblies through various user input interfaces. An Internet of Things motherboard operational in the sanitizing assemblies to enable communication between sanitizing assemblies, network nodes, and a centralized server. A network controller and a network interface enhance operation and communications for the sanitizing assemblies.

20 Claims, 3 Drawing Sheets

(51) Int. Cl.
*H04L 67/125* (2022.01)
*H04L 67/1042* (2022.01)
*H04L 67/50* (2022.01)
*A47L 9/00* (2006.01)
*A47L 11/29* (2006.01)
*A47L 11/02* (2006.01)
*H04B 5/00* (2006.01)

(52) U.S. Cl.
CPC ........... *H04B 5/0043* (2013.01); *H04L 63/04* (2013.01); *H04L 67/1042* (2013.01); *H04L 67/22* (2013.01); *A47L 2201/04* (2013.01)

(58) Field of Classification Search
CPC ..... H04L 41/0816; H04L 41/16; H04L 43/10; H04L 43/106; H04L 47/283; H04L 47/82; H04L 51/02; H04L 5/0007; H04L 5/0028; H04L 5/0053; H04L 12/2807; H04L 12/2834; H04L 41/28; H04L 63/0428; H04L 63/20; H04L 9/0819; G06F 3/017; G06F 1/163; G06F 3/00; G06F 3/167; G06F 3/038; G06F 1/1652; G06F 1/1684; G06F 1/1698; G06F 2203/0381; G06F 2203/0384; G06F 3/0482; G06F 3/0488; G06F 3/04883; G06F 3/04817; G06F 3/04847; G06F 3/011; G06F 3/016; G06F 2203/0331; G06F 3/014; G06F 3/015; G06F 3/0325; G06F 3/0346; G06F 3/04815

See application file for complete search history.

(56) References Cited

U.S. PATENT DOCUMENTS

2018/0317725 A1* 11/2018 Lee ................. A47L 9/2826
2019/0036906 A1* 1/2019 Biyani ................. H04L 9/3236
2019/0212730 A1* 7/2019 Jones ................. G05B 19/4155

* cited by examiner

US 11,303,707 B1

INTERNET OF THINGS SANITIZATION SYSTEM AND METHOD OF OPERATION THROUGH A BLOCKCHAIN NETWORK

CROSS REFERENCE OF RELATED APPLICATIONS

This application claims the benefits of U.S. provisional application No. 62/718,916, filed Aug. 14, 2018, and entitled Smart Sanitizing System and Network, wherein said provisional application is incorporated by reference herein in its entirety.

FIELD OF THE INVENTION

The present invention relates generally to an Internet of Things (IoT sanitization system and methods of operation through a blockchain network, and, more particularly, relates to one or more sanitizing assemblies that are operable to clean a surface, and communicate with each other and other network nodes on a blockchain network; and further provide an Internet of Things (IoT) motherboard integral in the sanitizing assembly that enables data and position communications, so as to receive, process, and communicate data relating to: identifying a user, determining which of the sanitizing assemblies and components thereof are operable, and determining usage metrics of the sanitization assemblies.

BACKGROUND OF THE INVENTION

Typically, the Internet represents a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, the network also may be implemented as a number of different types of networks, such as for example, an Intranet, a local area network (LAN), or a cellular network as described above.

Generally, a blockchain network is different than a standard network because it does not have one central point that stores and controls information. Rather, the responsibility to look after the network and store information is shared by different devices, known as peers, on that network. This is why a blockchain network us known as a peer-to-peer (P2P) network. The tasks and responsibilities of maintaining the network are shared from peer to peer.

It is known in the art that cleaning and sanitizing equipment utilizes various cleaning methods and chemicals to facilitate and expedite the cleaning process. This often includes internal, general and routine cleaning, such as for floors, tiles, partition walls, internal walls, suspended ceilings, lighting, furniture and cleaning, window cleaning, deep cleans of sanitary conveniences and washing facilities, kitchens and dining areas, cleaning of telephones, and IT components. In addition, carpet cleaning, such as vacuuming, requires shampoos and hot water extraction application. It can be difficult to track multiple carpet cleaners in a large area.

Therefore, a need exists to overcome the problems with the prior art as discussed above.

SUMMARY OF THE INVENTION

The invention provides an Internet of Things sanitization system and method of operation through a blockchain network, and, more particularly, relates to one or more independently operating sanitizing assemblies, having an Internet of Things (IoT) motherboard that is operably configured to enable the sanitizing assemblies to communicate with each other, network nodes, a centralized server, and other network devices through a secure blockchain network. The sanitizing assemblies are operable to both sanitize/clean a surface; and also to generate, collect, process, and communicate data pertinent to the cleaning process. The data is transmitted across a peer-to-peer network, such as a blockchain network for the purposes of: (1) identifying a user, (2) determining which of the sanitizing assemblies and components thereof are operable, and (3) determining usage metrics of the sanitization assemblies. The transmission of this data occurs over the blockchain network, which creates a secure data environment. The Internet of Things sanitization system overcomes the hereinafore-mentioned disadvantages of the heretofore-known systems and methods of this general type that sanitize/clean, and that communicate remotely over the blockchain network while being remotely monitored and controlled.

With the foregoing and other objects in view, there is provided, in accordance with the invention, an Internet of Things sanitization system that includes one or more sanitizing assemblies that are operable to clean a surface. Each sanitizing assembly comprises a unique code. In some embodiments, the system may also include a user input interface that is operable on the one or more sanitizing assemblies, the user input interface being operably configured to collect a user identification data associated with a user of the one or more sanitizing assemblies.

In some embodiments, the system may also include an Internet of Things motherboard operable on the one or more sanitizing assemblies, the Internet of Things motherboard being operably configured to enable communication between the one or more sanitizing assemblies, the Internet of Things motherboard further being operable to enable communication between the one or more sanitizing assemblies and one or more nodes, the communications being operable across a peer-to-peer network.

In some embodiments, the system may also include a processor that is in operational communication with the Internet of Things motherboard, the processor operably configured to process a sanitizing assembly data associated with the one or more sanitizing assemblies, the processor further being operably configured to process a usage data associated with the one or more sanitizing assemblies and the user, whereby the Internet of Things motherboard communicates the data to the one or more sanitizing assemblies and the one or more nodes that are communicatively coupled together over the network, whereby the decentralized configuration of the peer-to-peer network enhances security of the data communications.

In accordance with another feature, an embodiment of the present invention the one or more sanitizing assemblies comprise a reservoir containing a sanitizing medium, and further comprise a sanitizing mechanism operable to apply the sanitizing medium on the surface.

In accordance with a further feature of the present invention, the sanitization assemblies comprise at least one of the following: a vacuum, a carpet steamer cleaner, a floor cleaner, an auto scrubber, a blower, a floor scrubber, a floor buffer, a burnisher, a carpet extractor, a pressure washer, a car wash, a washing machine, an air cleaner, a window cleaning mechanism, a microchip cleaner, and a micro-cleaning mechanism.

In accordance with another feature, an embodiment of the present invention includes one or more sensors operably configured to sense at least one of the following: the proximity of the user to the one or more sanitizing assemblies, the amount of the sanitizing medium in the reservoir, and the relational positions between the one or more sanitizing assemblies.

In accordance with a further feature of the present invention, the sanitizing assemblies are mobile, suing wheels, rollers, sleds, or other motion transfer means known in the art of sanitizing equipment.

In accordance with a further feature of the present invention, the peer-to-peer network comprises a blockchain network.

In accordance with a further feature of the present invention, the one or more nodes comprise at least one of the following: a centralized server, a transceiver, a third-party server, and an Internet of Things reviewer.

In accordance with a further feature of the present invention, the Internet of Things motherboard is operable to enable communication between the one or more sanitizing assemblies based on the unique codes.

In accordance with another feature, an embodiment of the present invention includes a network controller operatively connected to the Internet of Things motherboard, the network controller being operably configured to regulate operation of the one or more sanitizing assemblies.

In accordance with another feature, an embodiment of the present invention includes a network interface operatively connected to the Internet of Things motherboard, the network interface being operably configured to connect the one or more sanitizing assemblies to the one or more nodes.

In accordance with a further feature of the present invention, the network interface includes at least one of the following: one or more network interface cards, a personal area network interface, a local area network interface, and a wide area network interface.

In accordance with another feature, an embodiment of the present invention includes a near field communication operatively connected to the Internet of Things motherboard, the near field communication enabling close range data exchange between the one or more sanitizing assemblies and the one or more nodes.

Although the invention is illustrated and described herein as embodied in an Internet of Things sanitization system and method of operation through a blockchain network, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

Figure 1:
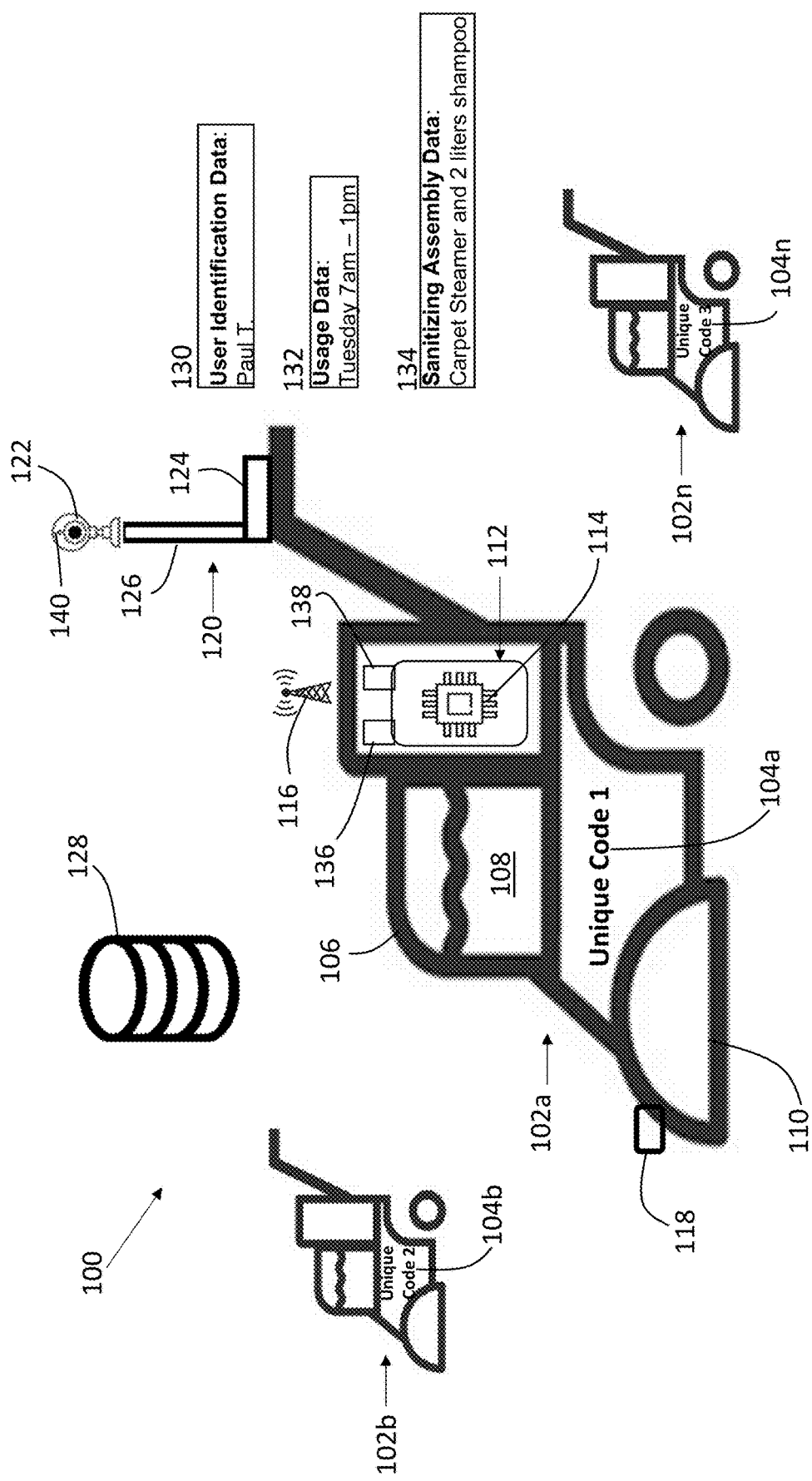
FIG. 1 is a perspective view of an exemplary Internet of Things (IoT) sanitization system, showing multiple sanitizing assemblies and communication components, in accordance with the present invention.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The present invention provides a novel and efficient Internet of Things sanitization system 100 and method of operation through a blockchain network. Embodiments of the invention provide one or more independently operating sanitizing assemblies 102a-n that are configured to clean a surface, and include a reservoir 106 containing sanitizing medium 108 and a sanitizing mechanism 110 that work to sanitize/clean the surface. The sanitizing assemblies 102a-n connect through a peer-to-peer network 200, such as a blockchain network, so as to generate, collect, process, and communicate data pertinent to the cleaning process.

In addition, embodiments of the invention provide that the data is transmitted across the blockchain network, for the purposes of: identifying a user; determining which of the sanitizing assemblies 102a-n and components thereof are operable; and determining usage metrics of the sanitizing assemblies 102. Further, the data is collected directly from the sanitizing assemblies 102a-n through various user input interfaces.

In addition, embodiments of the invention provide an Internet of Things motherboard 112 operational integrally in the sanitizing assemblies 102a-n. The Internet of Things motherboard 112 is configured to enable communication between the one or more sanitizing assemblies 102a-n, one or more network nodes 304, and a centralized server 128 through a secure blockchain network. A network controller 136 and a network interface 138 are also included, serving to enhance operation and communications between sanitizing assemblies 102a-n and network nodes 304, 128.

Referring now to FIG. 1, one embodiment of the present invention is shown in a perspective view. FIG. 1 shows several advantageous features of the present invention, but, as will be described below, the invention can be provided in several shapes, sizes, combinations of features and components, and varying numbers and functions of the components. The first example of a sanitization assembly 102a, as shown in FIG. 1, includes one or more sanitizing assemblies 102a-n that are operable to clean and/or sanitize a surface. The present invention is unique in combining the cleaning capacity of the sanitizing assemblies 102a-n, with an intelligent data collection and transfer capacity that is operable over a peer-to-peer network 200. Further, an Internet of Things motherboard 112 allows for remote control and monitoring of the sanitizing assemblies 102a-n while in cleaning operation. Each sanitizing assembly comprises a unique code 104a-n that allows for the identification and operation thereof by the Internet of Things motherboard 112, network nodes, and from a remote location.

As for the present invention's cleaning capacity, the sanitizing assemblies 102a-n may include, without limitation, a vacuum, a carpet steamer cleaner, a floor cleaner, an auto scrubber, a blower, a floor scrubber, a floor buffer, a burnisher, a carpet extractor, a pressure washer, a car wash, a washing machine, an air cleaner, a window cleaning mechanism, a microchip cleaner, and a micro-cleaning mechanism. However, in other embodiments, any sanitizing or cleaning mechanism known in the art may also be used in the capacity described in this invention.

In one non-limiting embodiment, the sanitizing assembly includes cleaning equipment that provides professional grade, janitorial cleaning, and household cleaning/sanitizing functionality. For example, a carpet cleaner, such as shown in FIG. 1 discharges a shampoo directly on a carpet while forcibly scrubbing the carpet with a revolving brush. In some embodiments, the sanitizing assemblies 102a-n are mobile through wheels, rollers, sleds, articulating arms, and other mobility means known in the art.

In one non-limiting embodiment, the sanitizing assemblies 102a-n comprise a mobile housing. The housing includes a reservoir 106 that is sized and dimensioned to contain a sanitizing medium 108. The sanitizing medium 108 may include, without limitation, soap, bleach, acid, etching chemical, or industrial cleaner known in the art. The sanitizing assemblies 102a-n may also include a sanitizing mechanism 110 that is operable to apply the sanitizing medium 108 on the surface for cleaning. The sanitizing mechanism 110 may include, without limitation, a tube in communication with the reservoir 106, a discharge nozzle, a trigger, and a revolving brush.

In a preferred embodiment, the sanitizing assembly 102a comprises a sanitizing fluid housed in a fluid reservoir, a fluid sanitizing mechanism, e.g., a nozzle and/or electromechanical valve/actuator, a processor 114, a controller, an IoT motherboard 112 and a networking interface 138 (also referred to herein as a "gateway") operably configured to communicatively couple to the network, a transceiver 116, one or more sensors 118 operably configured to sense the proximity of a user, product status information, such as the amount of an available product, e.g., sanitizing fluid, in the device, and/or other electrical and mechanical components needed to carry out the process, features, and characteristics of the present invention described herein.

As discussed above, the system 100 allows the sanitizing assemblies 102a-n to generate, collect, and process data 130, 132, 134 that is pertinent to the cleaning operation. This data can be monitored and manipulated remotely to create an efficient cleaning operation. In one exemplary embodiment, the system 100 is configured to provide data pertinent to use of the one or more sanitizing assemblies 102a-n. The data may include, without limitation: the identification of a user utilizing the sanitizing assembly—a user identification data 130; how and when the sanitizing assembly is used by the user—a usage data 132; and the current status of features or components of the sanitizing assembly over the blockchain network—a sanitizing assembly data 134.

The user identification data 130 is obtained from the actual user or operator of the sanitizing assembly. Due to the secure configuration of the blockchain network, the sanitizing assembly 102a discussed herein may receive and store information related to the user. This secure data capacity is operable through one or more data inputs or receptors that receive user identification data 130, such as an employee's identification number associated with the employee's personal identifying information, e.g., name, age, length of employment, department.

For purposes of collecting a user identification data 130, the sanitizing assemblies 102 provide a user input interface 120 located directly on the sanitizing assembly 102a. The user input interface 120 is operably configured to collect the user identification data 130 associated with a user of the one or more sanitizing assemblies 102a-n. The user input interface 120 may include, without limitation, a camera 122, a keyboard 124, a computer display 126, and an audio input/output 140.

In one non-limiting embodiment, the data inputs for the sanitizing assembly 102a, 102b, 102n may include a camera 122, a user input interface 120, a network interface 138, a memory in the processor 114, a processing device, a computer display 126, and an audio input/output 140. In another embodiment, the sanitizing assembly 102a may include a user input interface 120 that functions to provide the user a method of providing input to the device 102. In some embodiments, the user input interface 120 may be a keyboard 124 providing a variety of user input operations.

For example, the keyboard 124 may include alphanumeric keys for allowing entry of alphanumeric information (e.g. telephone numbers, contact information, content for display, text, etc.). The user input interface 120 may include special function keys (e.g. a camera shutter button, volume control buttons, back buttons, home button, etc.), navigation and select keys, a pointing device, and the like. Keys, buttons, and/or keyboards may be implemented as a touchscreen associated with the sanitizing assembly. The touchscreen may also provide output or feedback to the user, such as haptic feedback or orientation adjustments of the keyboard 124.

In another embodiment, the user identification data 130 may be received wirelessly through a tag having a computer readable medium 108 disposed thereon, said computer readable medium 108 housing user identification data 130. Other user identification data 130 receiving means, however, are contemplated and with the scope of the present invention.

For example, the device may also utilize facial recognition to associate a user with stored user identification data 130. The user identification data 130 is preferably stored on a centralized server 128, whereby the sanitizing assembly is operably configured to receive and transmit user identification data 130 from and to the centralized server 128, thereby minimizing processing data on the sanitizing assembly itself.

Looking back at FIG. 1, the system 100 provides one or more sensors 118 that are operable directly on the sanitizing assembly 102a. The sensors 118 are configured to sense for objects in the proximity of the sanitizing assemblies 102a-n, and consequently cause data to be generated therefrom. In some embodiments, the sensors 118 may sense the proximity of the user 204 to the sanitizing assemblies 102a-n. The sensors 118 can also sense the amount of the sanitizing medium 108 in the reservoir 106.

Additionally, the sensors 118 can sense the relational positions between the one or more sanitizing assemblies 102a-n. The sensors 118 may include, without limitation, a motion sensor, a n infrared sensor, a heat sensor, and a light sensor. For example, an infrared sensor detects the proximity of the user 204, and automatically powers on when the user 204 is within 3" of the handle bar; and powers off when the user 204 has distanced over 5" from the handle bar.

In some embodiments, the system 100 may also include an Internet of Things motherboard 112 that is operable inside the processing components of the sanitizing assembly 102a. The Internet of Things motherboard 112 is the network component that allows for inter-assembly communication, and remote communication/operation of the sanitizing assemblies 102a-n. The Internet of Things motherboard 112 is configured to enable communication of data and position between the sanitizing assemblies 102a-n, and specifically over the peer-to-peer network 200, i.e., blockchain network. The Internet of Things motherboard 112 is also operable to enable communication between the one or more sanitizing assemblies 102a-n and one or more network nodes.

In one preferred embodiment, the IoT motherboard 112 includes a processor 114 that is configured to execute instructions housed on a memory resident on the motherboard 112. The IoT motherboard 112 is also operably configured to relay information or data received from the sanitizing assembly, coupled thereto, to another sanitizing assembly via a blockchain network on a wireless area network (WAN) or cellular network. In one embodiment, the Internet comprises a WAN.

In some embodiments, the one or more network nodes include various electrical devices in a network, such as a centralized server 128, a transceiver 116, a third-party server, and an Internet of Things reviewer 210, i.e., IoT reviewer 210 inspector. These communications occur across the peer-to-peer network 200, as the Internet of Things motherboard 112 is operable to enable communication between the sanitizing assemblies 102a-n based on their unique code 104a-ns.

In one embodiment, the IoT motherboard 112 is operably configured to communicatively couple with the blockchain network through an application user 204 interface (API) executable over a hypertext transfer protocol (HTTP) that uses logical links between network nodes containing text. In this manner, the sanitizing assemblies 102a-n communicate over the peer-to-peer network 200 to other sanitizing assemblies 102a-n, network nodes, a centralized or administrative server 212, a third-party server, and/or an IoT reviewer/inspector 210.

In this manner, the Internet of Things motherboard 112 communicates the data 130, 132, 134 to the one or more sanitizing assemblies 102a-n and/or the one or more nodes that are communicatively coupled together over the peer-to-peer network 200. Advantageously, the decentralized configuration of the peer-to-peer network 200 enhances security of the data communications. This is because on a blockchain network, information is being constantly recorded and interchanged between all of the sanitizing assemblies 102a-n and network nodes operating on the blockchain network. Consequently, data is not held in one centralized point, meaning communications do not slow down when more sanitizing assemblies 102a-n or nodes enter the network. It also makes it less likely that data will be hacked or lost.

In some embodiments, the system 100 may also include a processor 114 that is in operational communication with the Internet of Things motherboard 112. The processor 114 is configured to process a sanitizing assembly data 134 that is associated with the sanitizing assemblies 102a-n. Further, the processor 114 is configured to process a usage data 132 associated with the sanitizing assemblies 102a-n and the user 204.

The processor 114 is operable in the sanitizing assembly, serving to process, transmit, and utilize a sanitizing assembly data 134, which includes the type of sanitizing assembly in usage, and the sanitizing medium 108 being utilized therein. As discussed above, each sanitizing assembly has a unique identifier. This uniqueness enables the processor 114 to identify which sanitizing assembly 102a, 102b, 102n is in use, at what frequencies the assembly is being used, and with which user 204.

The processor 114 is also configured to obtain, transmit, and/or utilize usage data 132, such as, for example, the amount of times the user 204 has utilized the sanitizing assembly, the quantity of the sanitizing fluid used by the users, etc. Continuing further, the sanitizing assembly 102a is also operably configured to obtain, transmit, and/or utilize product use data. For example, the sanitizing assembly 102a may utilize a sensor to monitor the level of sanitizing fluid housed in the device, the amount of sanitizing wipes remaining in the device, etc. In yet other embodiments, the centralized server 128 or other computing device automatically relays the usage data 132 and/or a request for delivery to a third-party computing device, e.g., a sanitizing fluid delivery company.

In one alternative embodiment, the user 204 may receive tokens for achieving certain milestones or targets associated with sanitizing or utilizing the sanitizing assembly according to a threshold set by an administrator or autonomously by the sanitizing assembly and/or server. These tokens may be redeemable by the user 204 for tangible or intangible benefits. The data stored on the blockchain may then be reviewed and/or analyzed to create efficiency and/or action protocols, such as ordering more sanitizing fluid when a certain amount is reached, or ordering, for example, every Tuesday of every other week as use statistics provide that is when the sanitizing fluid will be low enough for changing.

Looking again at FIG. 1, the system 100 provides a network controller 136 that is operatively connected to the Internet of Things motherboard 112. The network controller 136 is configured to regulate operation of the one or more sanitizing assemblies 102a-n. In yet other embodiments, the system 100 provides a network interface 138 that is operatively connected to the Internet of Things motherboard 112. The network interface is configured to connect the one or more sanitizing assemblies 102a-n to the one or more nodes. In one non-limiting embodiment, the network interface includes at least one of the following: one or more network interface cards, a personal area network interface, a local area network interface, and a wide area network interface.

Additionally, the sanitizing assemblies 102a-n include a near field communication (NFC) interface that is operatively connected to the Internet of Things motherboard 112. The NFC interface enables close range data exchange between the one or more sanitizing assemblies 102a-n and the one or more nodes. In one embodiment, the NFC interface may allow for extremely close-range communication at relatively low data rates (e.g., 424 kb/s).

The NFC interface may take place via magnetic field induction, allowing the NFC interface to communicate with other NFC interfaces located on other computing devices or to retrieve information from tags having radio frequency identification (RFID) circuitry. The NFC interface may enable initiation and/or facilitation of data transfer from and to computing devices within an extremely close range (e.g. 4 centimeters).

Figure 2:
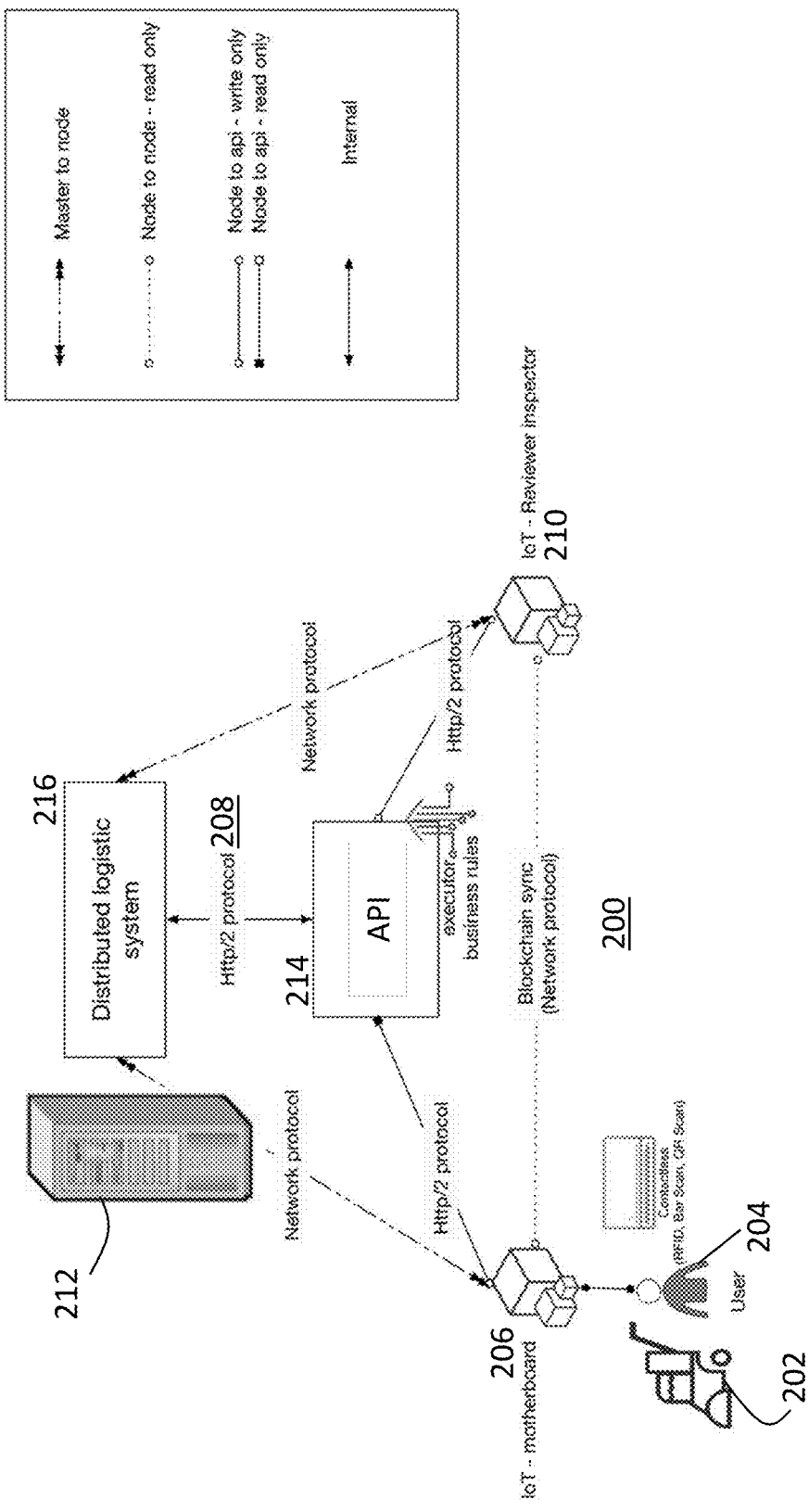
FIG. 2 is a block diagram of an exemplary blockchain network for the Internet of Things sanitization system, showing multiple sanitizing assemblies, in accordance with the present invention.

Referring now to FIG. 2, one embodiment of the present invention is shown through a schematic block diagram. FIG. 2 shows several advantageous features of the present invention, but, as will be described below, the invention can be provided in several shapes, sizes, combinations of features and components, and varying numbers and functions of the components. The first example of a blockchain sanitization system includes a network operably configured to receive, process, and communicate information and data relating to: (1) user identification, (2) sanitizing assembly, and (3) usage. This communication occurs over a peer-to-peer network 200, such as the aforementioned blockchain network.

Beneficially, an exemplary peer-to-peer network 200 is depicted in FIG. 2. The peer-to-peer network 200 shows several advantageous features of the present invention. Specifically, the network 200 includes connections which are the medium used to provide communication links between various sanitizing assemblies 202 connected together within the network 200. The connections are preferably wireless connections. There may be embodiments, however, when a computing device is connected to the network through a wired connection. A few exemplary wired connections are cable, phone line, and fiber optic. Exemplary wireless connections include radio frequency (RF) and infrared radiation (IR) transmission. Many other wired and wireless connections are known in the art and can be used with the present invention.

The Internet represents a worldwide collection of networks and gateways that use the TCP/IP suite of protocols 208 to communicate with one another. At the heart of the Internet is a backbone of high-speed data communication lines between major nodes or host computers, consisting of thousands of commercial, government, educational and other computer systems that route data and messages. Of course, the network also may be implemented as a number of different types of networks, such as for example, an Intranet, a local area network (LAN), or a cellular network as described above.

Those skilled in the art will recognize that a blockchain network is different than a standard network because it does not have one central point that stores and controls information. Rather, the responsibility to look after the network and store information is shared by different devices, known as peers, on that network. This is why a blockchain network us known as a peer-to-peer (P2P) network. The tasks and responsibilities of maintaining the network are shared from peer to peer.

It is also recognized that the blockchain network utilizes digital blocks, which are linked using cryptography, are readable, include a cryptographic hash of the previous block in the chain, a timestamp, and transaction data (generally represented as a Merkle tree root hash). As those of skill in the art will appreciate, the blockchain is resistant to modification of the data, which may include the user identification data, sanitizing assembly usage data, and/or product use data received manually or automatically from the sanitizing assembly and/or the user.

As such, information and data received the sanitizing assembly 202 and/or user 204 associated with device can be stored in a distributed ledger that can record transactions in an efficient, verifiable, and permanent way. Once data in the blockchain is recorded, the data in any given block cannot be altered retroactively without alteration of all subsequent blocks, which requires consensus of the network majority. In some embodiments, a distributed logistic system 216 supports a blockchain API 214 that is used to connect the motherboard 206 to the peer-to-peer network 200.

Figure 3:
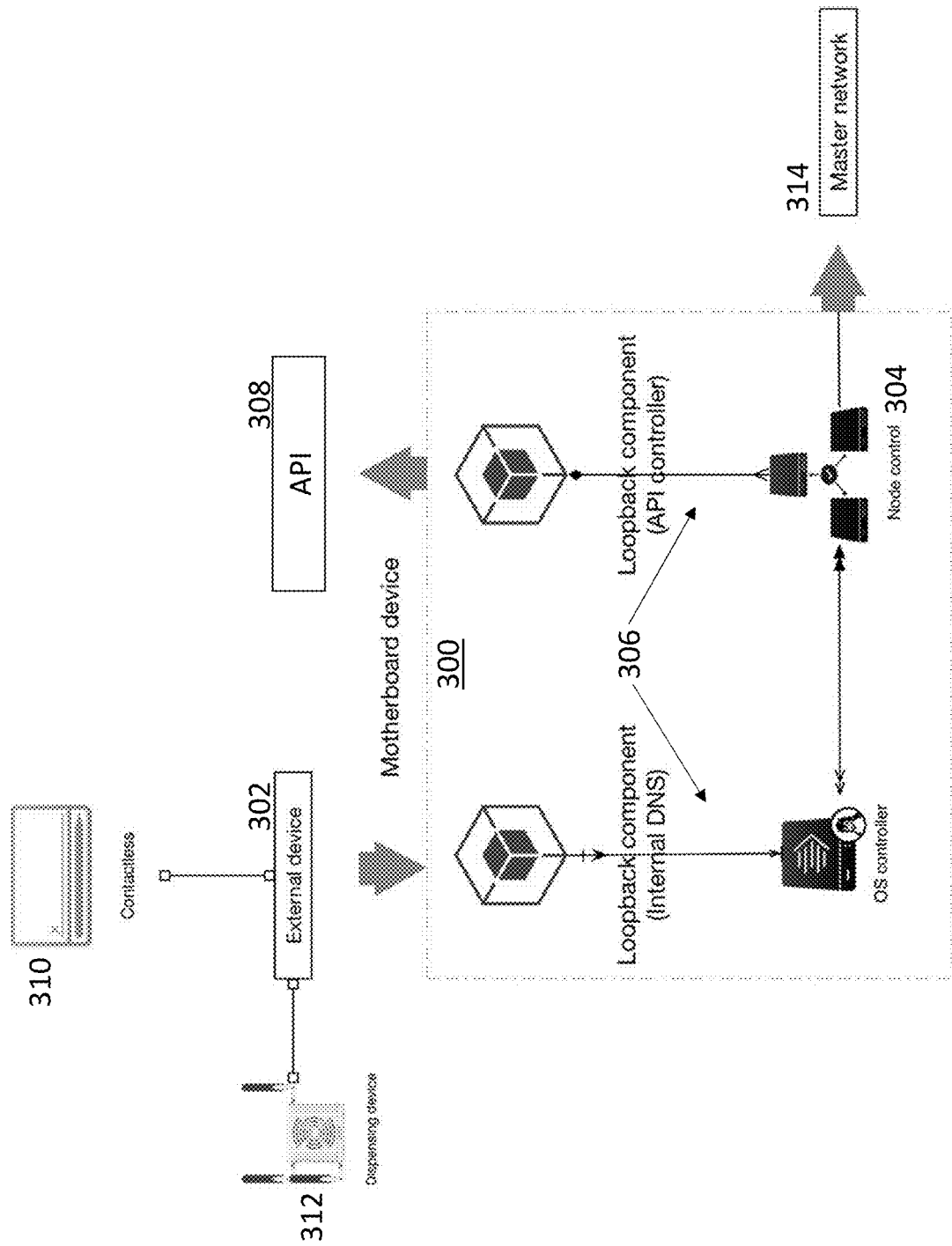
FIG. 3 is a block diagram of an exemplary IoT motherboard, in accordance with the present invention.

Beneficially, the aforementioned data is transmitted by the sanitizing assembly through and over the blockchain network utilizing a networking interface that serves as gateway. With reference to FIG. 3, the electronic sanitizing assembly 202, namely the IoT motherboard 300, may include a loopback component 306, or internal NDS, that effectuates communication with an external computing device 302 communicatively coupled to the network 200 and to a dispensing device 312. A node controller 304 may also be utilized in connection with a blockchain API 308 to connect the motherboard 300 and/or sanitizing assembly to the network 200. The connection may also be through a contactless device 310.

The sanitizing assembly may also include a network interface that may include one or more network interface cards (NIC) or a network controller. In some embodiments, the network interface may include a personal area network (PAN) interface. The PAN interface may provide the capability for computing devices, such as a user's ID tag, to couple with the device and network using a short-range communication protocol, for example, a Bluetooth communication protocol. The PAN interface may permit one or more computing devices to connect wirelessly to another computing device via a peer-to-peer connection.

The network interface may also include a local area network (LAN) interface. The LAN interface may be, for example, an interface to a wireless LAN, such as a Wi-Fi network. The range of the LAN interface may generally exceed the range available via the PAN interface. Typically, a connection between two electronic devices via the LAN interface may involve communication through a network router or other intermediary device.

Additionally, the network interface may include the capability to connect to a wide area network (WAN) via a WAN interface. The WAN interface may permit a connection to, for example, a cellular mobile communications network. The WAN interface may include communications circuitry, such as an antenna coupled to a radio circuit having a transceiver for transmitting and receiving radio signals via the antenna. The radio circuit may be configured to operate in a mobile communications network, including but not limited to global systems for mobile communications (GSM), code division multiple access (CDMA), wideband CDMA (WCDMA), and the like.

As discussed above, the centralized server is preferably configured to house and/or review the data received or ascertained by the sanitizing assembly, and will include a memory resident on the server to effectuate the same. However, in other embodiments, the sanitizing assembly may also include a memory to effectuate the same. The memory may be, for example, one or more buffer, a flash memory, or non-volatile memory, such as random-access memory (RAM). The devices, however, may also include non-volatile storage. The non-volatile storage may represent any suitable storage medium, such as a hard disk drive or non-volatile memory, such as flash memory.

The devices discussed herein, e.g., the server or sanitizing assembly, may also include a processer which can be, for example, a central processing unit (CPU), a microcontroller, or a microprocessing device, including a "general purpose" microprocessing device or a special purpose microprocessing device. The processer executes code stored in the memory to carry out operation/instructions associated with the above-described process. Further, the processor may provide the processing capability to execute an operating system, run various applications, and provide processing for one or more of the techniques described herein. The data can also be transmitted to a master network 314 for additional storage and communication functions. Many uses and applications of the data stored on the blockchain, however, are contemplated as within the scope of this disclosure.

These and other advantages of the invention will be further understood and appreciated by those skilled in the art by reference to the following written specification, claims and appended drawings.

Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. An Internet of Things sanitization system, the system comprising:
    one or more sanitizing assemblies operably configured to clean or sanitize a surface, each sanitizing assembly having product usage data associated therewith;
    a user input interface operable on the one or more sanitizing assemblies;
    an Internet of Things motherboard operable on the one or more sanitizing assemblies, an application user interface, and with a networking interface, the Internet of Things motherboard being operably configured to enable communication between the one or more sanitizing assemblies, the Internet of Things motherboard further being operable to enable read only communication between one or more nodes, including the one or more sanitizing assemblies, the communications being operable using the networking interface, through an application user interface operable with the Internet of Things motherboard, and across a peer-to-peer blockchain network operably configured to record data incapable of retroactive alteration without consensus of a network majority; and
    a processor in operational communication with the Internet of Things motherboard and operably configured to:
        process a sanitizing assembly data associated with the one or more sanitizing assemblies;
        process the usage data associated with the one or more sanitizing assemblies; and
        cause relay of the sanitizing assembly data and the usage data, using the networking interface, to the one or more nodes over the peer-to-peer blockchain network and through the application user interface, whereby the decentralized configuration of the peer-to-peer blockchain network enhances security of the data communications.

2. The system according to claim 1, wherein:
the sanitization assemblies comprise at least one of the following: a vacuum, a carpet steamer cleaner, a floor cleaner, an auto scrubber, a blower, a floor scrubber, a floor buffer, a burnisher, a carpet extractor, a pressure washer, a car wash, a washing machine, an air cleaner, a window cleaning mechanism, a microchip cleaner, and a micro-cleaning mechanism.

3. The system according to claim 1, wherein:
the one or more sanitizing assemblies comprise a reservoir containing a sanitizing medium.

4. The system according to claim 3, wherein:
The one or more sanitizing assemblies comprise a sanitizing mechanism operable to apply the sanitizing medium on the surface.

5. The system according to claim 4, further comprising:
one or more sensors operably configured to sense at least one of the following: the proximity of the user to the one or more sanitizing assemblies, the amount of the sanitizing medium in the reservoir, and the relational positions between the one or more sanitizing assemblies.

6. The system according to claim 1, wherein:
the sanitizing assemblies are mobile.

7. The system according to claim 1, wherein:
the one or more nodes comprise at least one of the following: a centralized server, a transceiver, a third-party server, and an Internet of Things reviewer.

8. The system according to claim 1, wherein:
the Internet of Things motherboard is operable to enable communication between the one or more sanitizing assemblies based on a unique code associated with the one or more sanitizing assemblies.

9. The system according to claim 1, wherein:
the network controller operatively connected to the Internet of Things motherboard is operably configured to regulate operation of the one or more sanitizing assemblies.

10. The system according to claim 1, wherein:
the network interface is operatively connected to the Internet of Things motherboard and is operably configured to connect the one or more sanitizing assemblies to the one or more nodes.

11. The system according to claim 10, wherein:
the network interface includes at least one of the following: one or more network interface cards, a personal area network interface, a local area network interface, and a wide area network interface.

12. The system according to claim 1, further comprising:
a near field communication operatively connected to the Internet of Things motherboard, the near field communication enabling close range data exchange between the one or more sanitizing assemblies and the one or more nodes.

13. The system according to claim 1, wherein:
the user input interface includes at least one of the following: a camera, a computer display, an audio input/output, and a keyboard.

14. The system according to claim 1, wherein:
the user input interface is operably configured to collect a user identification data associated with a user of the one or more sanitizing assemblies and the processor is operably configured to process the user identification data associated with the user and case relay of the user identification data to the one or more nodes over the peer-to-peer blockchain network and through the application user interface.

15. The system according to claim 1, wherein:
the application user interface is executable over a hypertext transfer protocol and utilizes digital blocks linked together using cryptography, are readable, include a cryptographic hash of the previous block in the chain, a timestamp, and transaction data.

16. The system according to claim 1, wherein the one or more nodes further comprises an Internet of Things reviewer, wherein the processor is operably configured to cause relay and write only of the sanitizing assembly data and the usage data, using the networking interface, to the Internet of Things reviewer over the peer-to-peer blockchain network and through the application user interface.

17. An Internet of Things sanitization system, the system comprising:
one or more sanitizing assemblies operable to clean a surface, each sanitizing assembly comprising a unique code, the one or more sanitizing assemblies further comprising a reservoir containing a sanitizing medium, the sanitizing assemblies further comprising a sanitizing mechanism operable to apply the sanitizing medium on the surface;
a user input interface operable on the one or more sanitizing assemblies, the user input interface being operably configured to collect a user identification data associated with a user of the one or more sanitizing assemblies;
one or more sensors operably configured to sense at least one of the following: the proximity of the user to the one or more sanitizing assemblies, the amount of the sanitizing medium in the reservoir, and the relational positions between the one or more sanitizing assemblies;
an Internet of Things motherboard operable on the one or more sanitizing assemblies, an application user interface, and with a networking interface, based on the unique codes, the Internet of Things motherboard being operably configured to enable read only communication between the one or more sanitizing assemblies, the Internet of Things motherboard further being operable to enable communication between the one or more sanitizing assemblies and one or more nodes, the communications being operable using the networking interface, through an application user interface operable with the Internet of Things motherboard, and across a peer-to-peer blockchain network operably configured to record data incapable of retroactive alteration without consensus of a network majority;
a network interface operatively connected to the Internet of Things motherboard, the network interface being operably configured to connect the one or more sanitizing assemblies to the one or more nodes;
a network controller operatively connected to the Internet of Things motherboard, the network controller being operably configured to regulate operation of the one or more sanitizing assemblies; and
a processor in operational communication with the Internet of Things motherboard, the processor operably configured to process a sanitizing assembly data associated with the one or more sanitizing assemblies, the processor further being operably configured to process a usage data associated with the one or more sanitizing assemblies and the user,
whereby the Internet of Things motherboard communicates the data to the one or more sanitizing assemblies and the one or more nodes that are communicatively coupled together over the peer-to-peer blockchain network and through the application user interface,
whereby the decentralized configuration of the blockchain network enhances security of the data communications.

18. The system according to claim 17, wherein:
the network interface includes at least one of the following: one or more network interface cards, a personal area network interface, a local area network interface, and a wide area network interface.

19. The system according to claim 17, wherein:
the one or more nodes comprise at least one of the following: a centralized server, a transceiver, a third-party server, and an Internet of Things reviewer.

20. The system according to claim 17, further comprising:
a near field communication operatively connected to the Internet of Things motherboard, the near field communication enabling close range data exchange between the one or more sanitizing assemblies and the one or more nodes.

* * * * *